Patented Mar. 23, 1926.

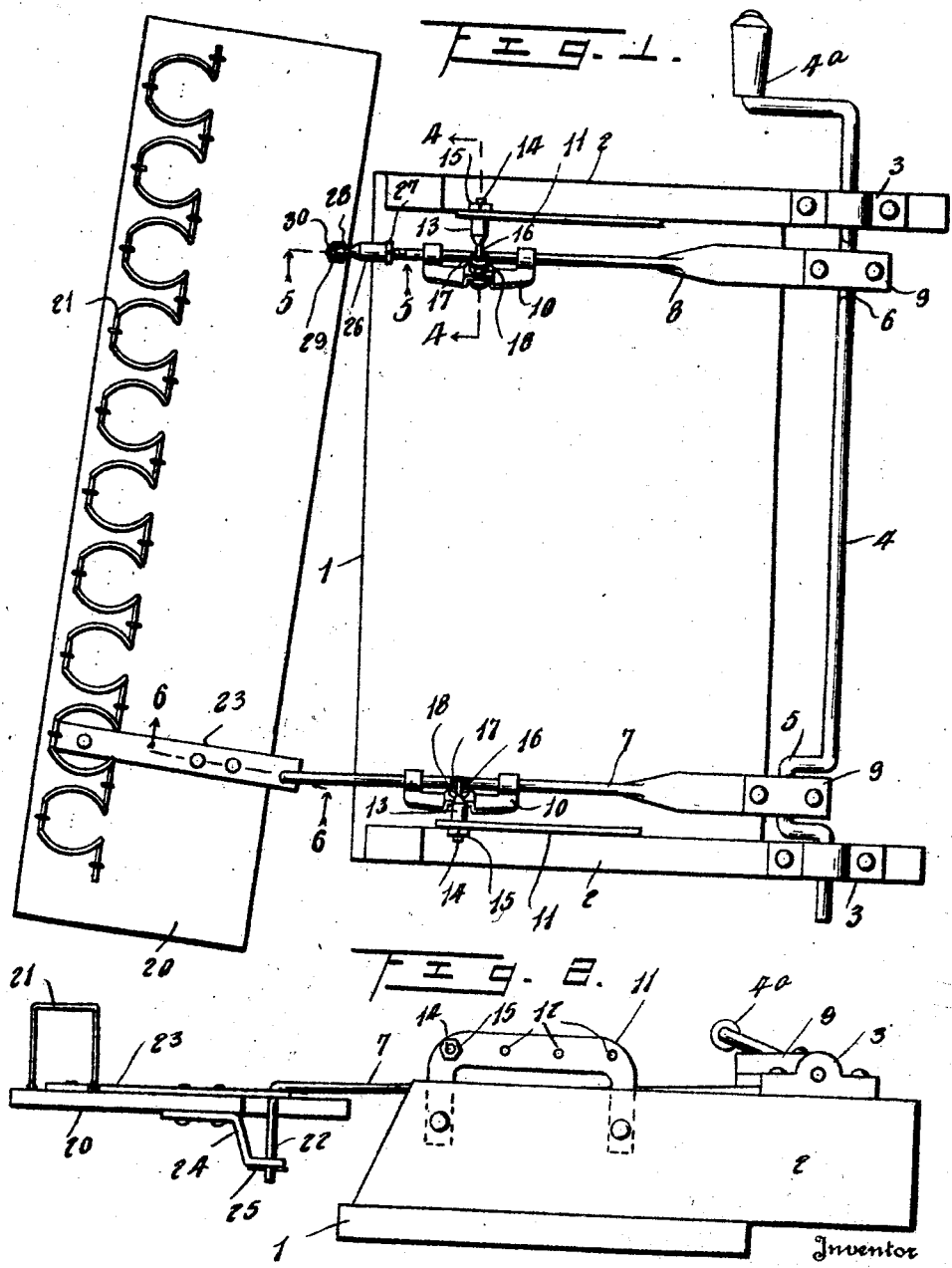

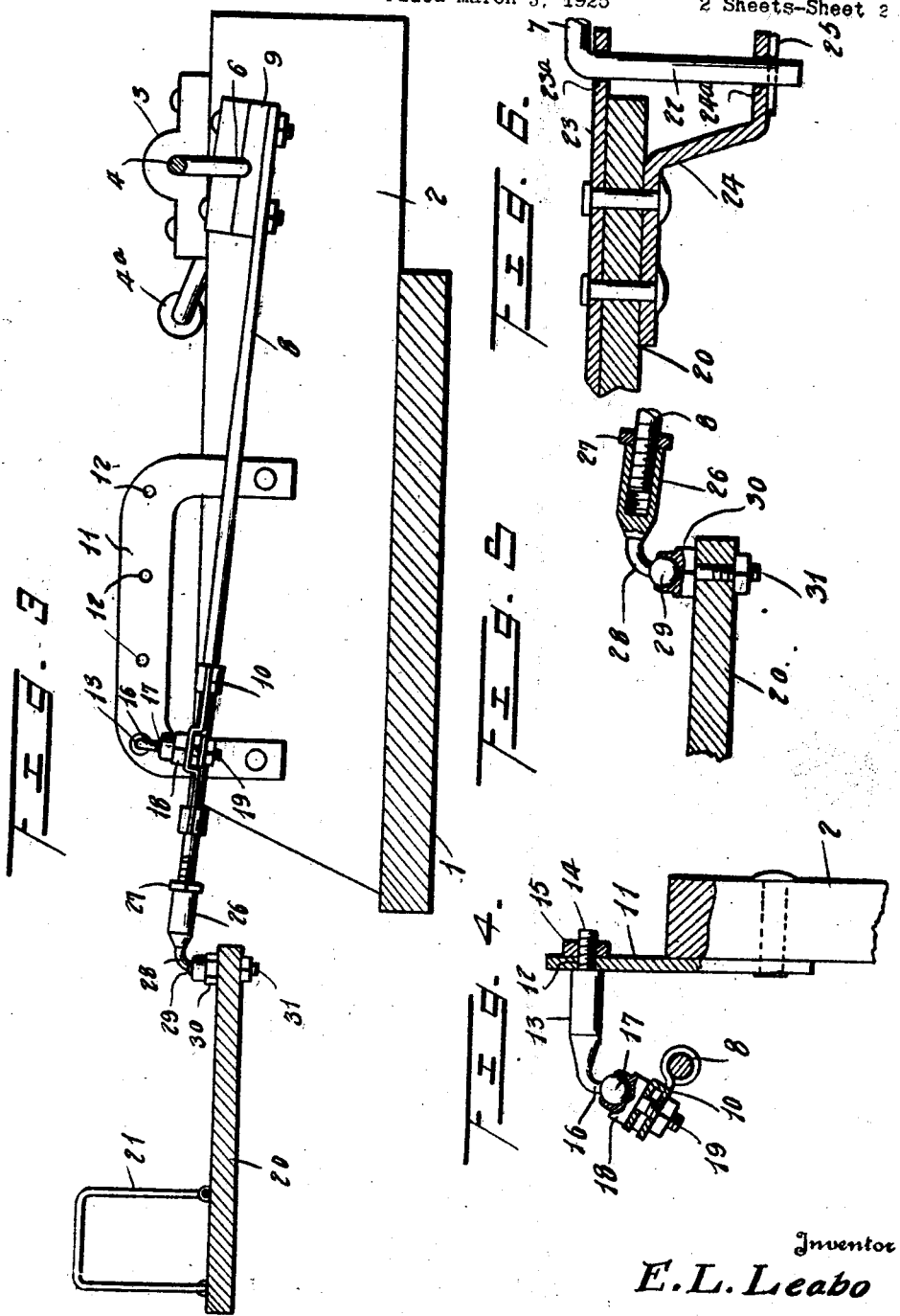

1,578,143

UNITED STATES PATENT OFFICE.

ELBERT L. LEABO, OF BOYD, OREGON.

TEST-BOTTLE-SHAKING MACHINE.

Application filed March 5, 1925. Serial No. 13,169.

*To all whom it may concern:*

Be it known that I, ELBERT L. LEABO, a citizen of the United States, residing at Boyd, in the county of Wasco and State of Oregon, have invented certain new and useful Improvements in Test-Bottle-Shaking Machines; and I do hereby declare the following to be a full, clear, and exact description of the invention, such as will enable others skilled in the art to which it appertains to make and use the same.

This invention relates to the art of testing cream and more particularly to the preparation of cream for test by the Babcock method. At the present time, cream is prepared for test by this method by placing a sample thereof and an acid in a test bottle and by thence manually imparting a circular motion to the bottle to blend or mix the cream and acid.

The invention has for one of its objects the provision of a novel and simple machine through the medium of which a plurality of test bottles may be moved in the direction necessary to blend or mix the cream and acid, whereby to permit a large number of samples of cream to be prepared for test in a comparatively short time and with the expenditure of comparatively little labor.

With the above and other objects in view, the invention consists of the construction, combination and arrangement of parts hereinafter fully described and claimed, and illustrated in the accompanying drawings, wherein:

Figure 1 is a top plan view of an acid and cream mixing machine constructed in accordance with my invention, Figure 2 is a view in end elevation of the machine, Figure 3 is a sectional view taken on a vertical plane extending centrally and longitudinally through the machine, Figure 4 is a detail sectional view taken on the plane indicated by the line 4—4 of Figure 1, Figure 5 is a detail sectional view taken on the plane indicated by the line 5—5 of Figure 1, and Figure 6 is a detail sectional view taken on the plane indicated by the line 6—6 of Figure 1.

Corresponding and like parts are referred to in the following description, and designated in the several views of the drawings, by similar reference characters.

The machine comprises a base 1 and parallel bars 2 which are secured to the base and extend beyond the rear edge thereof. Bearings 3 in which a crank shaft 4 is journaled, are secured to the upper edges of the bars 2 rearwardly beyond the rear edge of the base 1. The cranks 5 and 6 of the shaft 4 are arranged at right angles with respect to each other. Rods 7 and 8 are connected to the cranks 5 and 6, respectively, by bearing blocks 9. The rods 7 and 8 extend forwardly from the shaft 4, and are supported adjacent their forward ends by guides 10. Brackets 11 are secured to the bars 2, and are each provided with a horizontally arranged series of relatively spaced openings 12. Horizontal arms 13 are secured to the brackets 11 and each arm is provided with a threaded stem 14 which passes through one of the openings 12 and upon which is mounted a retaining nut 15. The arms 13 extend inwardly from the brackets 11 and have downturned inner ends 16 terminally provided with spherical heads 17. Socket members 18 secured to the guides 10 by bolts 19 and embracing the heads 17, establish a universal connection between the guides and arms 13. A carrier board 20 to which test bottles receiving clips 21 are secured, is secured to and supported from the forward ends of the rods 7 and 8. The rod 7 has, as most clearly shown in Figure 6, a pivotal connection with the carrier board 20, and the rod 8 has as most clearly shown in Figure 5 a universal connection with the carrier board. The connection between the rod 7 and the carrier board 20 is established by a journal 22 depending from the forward end of the rod and straps 23 and 24 secured respectively to the upper and lower sides of the carrier board and provided with openings 23ª and 24ª, respectively, for the reception of the journal. A pin 25 passing through the journal 22 and engaging the under side of the strap 24 secures the carrier board 20 to the journal. The connection between the rod 8 and the carrier board 20 is established by a sleeve 26 having threaded engagement with the forward end of the rod and locked thereon by a nut 27, a stem 28 extending forwardly and downwardly from the forward end of the sleeve and terminally provided with a spherical head 29, and a socket member 30 embracing the spherical head and secured to the carrier board by a bolt 31.

In practice the shaft 4 is rotated through the medium of a hand crank 4ª or by an electric or other motor. As the cranks 5 and 6 are angularly related, as the guides 10 are pivotally supported, and as the rod 7 has a pivotal connection with the carrier board 20 and the rod 8 a universal connection therewith, the reciprocation of the rods will move the carrier board forwardly and backwardly and at the same time oscillate and rock it upwardly and downwardly, with the result that the cream and acid in the test bottles supported by the clips 21 will be thoroughly blended or mixed. The openings 12 permit the arms 13 to be adjusted toward and from the shaft 4 when it is desired to alter the rocking motion of the rods 7 and 8.

From the foregoing description, taken in connection with the accompanying drawings, the advantages of the construction and of the method of operation of the machine should be readily apparent to those skilled in the art to which it appertains. While I have described the principle of operation of the machine, together with the structure which I now consider to be the best embodiment thereof, I desire to have it understood that the structure shown is merely illustrative and that such changes may be made therein as are within the scope of the claims.

What is claimed is:—

1. A test bottle shaking machine comprising a base, a shaft journaled on the base and provided with cranks, rods connected to the cranks, pivoted guides slidably receiving the rods, and a carrier connected to and supported by the rods.

2. A test bottle shaking machine comprising a base, a shaft journaled thereon and provided with cranks, rods connected to the cranks, pivoted guides slidably receiving the rods, a carrier, means pivotally connecting the carrier to one of the rods, and means establishing a universal connection between the carrier and the other rods.

3. A test bottle shaking machine comprising a base, a shaft journaled on the base and provided with cranks, rods connected to the cranks, pivotally and adjustably mounted guides slidably receiving the rods, and a carrier attached to and supported by the rods.

4. A test bottle shaking machine comprising a base, a shaft journaled on the base and provided with cranks, rods connected to the cranks, pivotally and adjustably mounted guides slidably receiving the rods, a carrier, means pivotally connecting the carrier to one of the rods, and means establishing a universal connection between the carrier and the other rod.

5. A test bottle shaking machine comprising rods, means slidably and rockably supporting the rods, a carrier carried by the rods, and means for imparting motion to the rods.

6. A test bottle shaking machine comprising rods, means slidably and rockably supporting the rods, a carrier, means pivotally connecting the carrier to one of the rods, means establishing a universal connection between the carrier and the other rod, and means for imparting motion to the rods.

7. A test bottle shaking machine comprising a carrier, carrier supporting elements, means reciprocably supporting said elements, and means for reciprocating said elements in opposite directions simultaneously.

8. A test bottle shaking machine comprising a carrier, carrier supporting elements, means rockably and reciprocably supporting said elements, and means for rocking said elements and reciprocating them in opposite directions simultaneously.

9. A test bottle shaking machine comprising a carrier, carrier supporting means embodying oppositely movable elements, and operating means for said elements.

10. A test bottle shaking machine comprising a carrier, elements connected to the carrier, means supporting the elements for movements in angularly related directions, and operating means for said elements.

In testimony whereof I affix my signature.

ELBERT L. LEABO.